(12) United States Patent
Solovyov et al.

(10) Patent No.: US 8,110,261 B2
(45) Date of Patent: Feb. 7, 2012

(54) OXYGEN ABSORBING PLASTIC STRUCTURE

(75) Inventors: Stanislov Solovyov, Getzville, NY (US); Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 835 days.

(21) Appl. No.: 12/055,632

(22) Filed: Mar. 26, 2008

(65) Prior Publication Data
US 2008/0241521 A1 Oct. 2, 2008

Related U.S. Application Data

(60) Provisional application No. 60/908,841, filed on Mar. 29, 2007, provisional application No. 60/909,247, filed on Mar. 30, 2007.

(51) Int. Cl.
*B05D 3/00* (2006.01)
*B32B 1/02* (2006.01)
*B32B 15/08* (2006.01)
*B32B 27/18* (2006.01)
*B32B 27/30* (2006.01)
*B32B 27/34* (2006.01)
*B32B 27/36* (2006.01)

(52) U.S. Cl. ...... 428/35.7; 428/36.6; 428/212; 428/332; 428/334; 428/335; 428/457; 428/474.4; 428/480; 428/500; 428/522; 427/393.5

(58) Field of Classification Search .................. None
See application file for complete search history.

(56) References Cited

U.S. PATENT DOCUMENTS

| | | | |
|---|---|---|---|
| 2,825,651 A | 3/1958 | Loo et al. | |
| 3,169,068 A | 2/1965 | Bloch | |
| 4,041,209 A | 8/1977 | Scholle | |
| 4,610,914 A * | 9/1986 | Newsome | 428/216 |
| 5,049,624 A | 9/1991 | Adams et al. | |
| 5,153,038 A | 10/1992 | Koyama et al. | |
| 5,262,375 A | 11/1993 | McKedy | |
| 5,310,497 A | 5/1994 | Ve Speer et al. | |
| 5,350,622 A | 9/1994 | Speer et al. | |
| 5,482,770 A * | 1/1996 | Bekele | 428/339 |
| 5,529,833 A | 6/1996 | Speer et al. | |
| 5,627,239 A | 5/1997 | Ching et al. | |
| 5,660,761 A | 8/1997 | Katsumoto et al. | |
| 5,700,554 A | 12/1997 | Speer et al. | |

(Continued)

FOREIGN PATENT DOCUMENTS
WO 94/12590 A1 6/1994
(Continued)

OTHER PUBLICATIONS

PCT Notification Concerning Transmittal of International Preliminary Report on Patentability (1 page).
(Continued)

*Primary Examiner* — Ramsey Zacharia
(74) *Attorney, Agent, or Firm* — Stephen B. Salai, Esq.; Paul A. Leipold, Esq.; Harter Secrest & Emery LLP

(57) ABSTRACT

Multilayer oxygen absorbing structure comprising at least two reactive oxygen scavenging layers arranged in sequence: a rapidly absorbing highly reactive oxygen-scavenging system, comprising an oxygen permeable matrix polymer and an oxygen scavenger, and a long life layer comprising high passive oxygen barrier matrix polymer, and an oxygen scavenger.

57 Claims, 6 Drawing Sheets

U.S. PATENT DOCUMENTS

Figure 1:
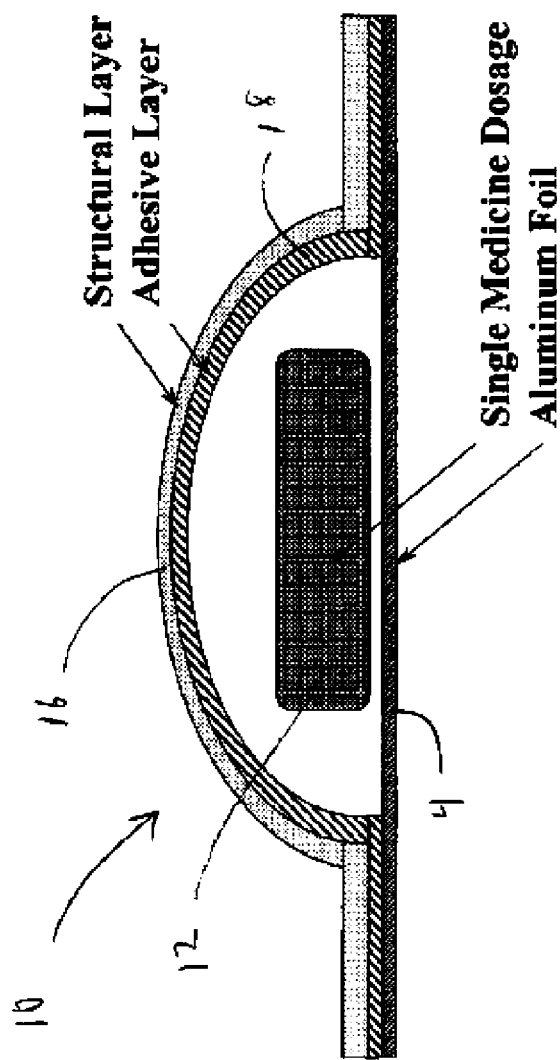

| | | | |
|---|---|---|---|
| 5,736,616 A | | 4/1998 | Ching et al. |
| 5,744,056 A | | 4/1998 | Venkateshwaran et al. |
| 5,759,653 A | | 6/1998 | Collette et al. |
| 5,804,016 A | * | 9/1998 | Schmidt et al. ............... 156/242 |
| 5,804,236 A | | 9/1998 | Frisk |
| 5,866,649 A | * | 2/1999 | Hong et al. ................... 524/538 |
| 5,958,254 A | | 9/1999 | Rooney |
| 5,981,676 A | | 11/1999 | Gauthier et al. |
| 6,037,022 A | | 3/2000 | Adur et al. |
| 6,057,013 A | | 5/2000 | Ching et al. |
| 6,123,901 A | | 9/2000 | Albert et al. |
| 6,194,042 B1 | | 2/2001 | Finkelstein et al. |
| 6,333,087 B1 | | 12/2001 | Jerdee et al. |
| 6,365,247 B1 | | 4/2002 | Cahill et al. |
| 6,391,407 B1 | | 5/2002 | Kashiba et al. |
| 6,406,644 B2 | | 6/2002 | Jerdee et al. |
| 6,437,086 B1 | | 8/2002 | Ching et al. |
| 6,455,620 B1 | | 9/2002 | Cyr et al. |
| 6,517,728 B1 | | 2/2003 | Rooney |
| 6,525,123 B1 | | 2/2003 | Yang et al. |
| 6,569,506 B1 | | 5/2003 | Jerdee et al. |
| 6,601,732 B1 | | 8/2003 | Rooney et al. |
| 6,610,772 B1 | | 8/2003 | Clauberg et al. |
| 6,646,175 B1 | | 11/2003 | Dath et al. |
| 6,682,791 B2 | | 1/2004 | McKnight |
| 6,756,130 B1 | | 6/2004 | Robert |
| 6,818,150 B2 | | 11/2004 | Galland et al. |
| 6,818,151 B2 | | 11/2004 | Yang et al. |
| 6,945,946 B2 | | 9/2005 | Rooney et al. |
| 7,087,277 B2 | | 8/2006 | Yang et al. |
| 2003/0091769 A1 | | 5/2003 | Slat et al. |
| 2003/0193038 A1 | | 10/2003 | Rooney |
| 2004/0077786 A1 | | 4/2004 | Robert et al. |
| 2004/0086749 A1 | * | 5/2004 | Kennedy et al. ............... 428/690 |
| 2004/0131809 A1 | | 7/2004 | McNight |
| 2004/0175314 A1 | | 9/2004 | Horsham et al. |
| 2005/0164021 A1 | | 7/2005 | Inoue et al. |

FOREIGN PATENT DOCUMENTS

| | | |
|---|---|---|
| WO | 96/34070 A1 | 10/1996 |
| WO | 98/12127 | 3/1998 |
| WO | 99/10251 A1 | 3/1999 |
| WO | 99/48963 A2 | 9/1999 |
| WO | 02/051825 A1 | 7/2002 |
| WO | 02/076916 A1 | 10/2002 |
| WO | 2004/055131 A1 | 7/2004 |

OTHER PUBLICATIONS

PCT International Preliminary Report on Patentability (1 page).
PCT Written Opinion of the International Searching Authority (5 pages).
PCT—Notification of Transmittal of the International Search Report and the Written Opinion of the International Searching Authority, or the Declaration; dated Aug. 12, 2009.
PCT—Written Opinion of the International Searching Authority; dated Aug. 12, 2009.
PCT—International Search Report; dated Aug. 12, 2009.
Frisch H. L., "The Time Lag in Diffusion", Jan. 1957 J. Phys. Chem. 61, 93-95.
Paul D.R., Kemp D.R., "The Diffusion Time Lag in Polymer Membranes Containing Adsorptive Filters", (1973). J. Polym. Sci., Symp. 41, 79-93.
Siegel R.A., Cussler E.L., "Reactive barrier membranes: some theoretical observations regarding the time lag and breakthrough curves", (2004) J. Membr. Sci. 229, 33-41.
Solovyov S.E., "Determining the Rate Constant of Diffusion-Controlled oxygen Scavenging Reaction in Polymer Membranes by Transient Permeability Measurements", (2004). J. Phys. Chem. B 108, 15618-15630.
Solovyov and Goldman, Int. J. Polym. Mater. 2005, vol. 54, pp. 71-91.
South, David, "Keeping food fresh by using additives", Southcorp., p. 5.
Lehtonen, Paavo, Oxygen Scavenging Film Base on Enzyme Catalytic Active Materials As Adhesive, Bioka Ltd.

* cited by examiner

OXYGEN ABSORBING PLASTIC STRUCTURE

FIELD OF THE INVENTION

This invention relates to heat sealable plastic film and sheet structures suitable for packaging oxygen sensitive products and having capabilities to absorb residual oxygen trapped in the package after sealing and to provide a highly reactive barrier to oxygen permeation, independent of both moisture diffusion and transition metal based catalysts.

BACKGROUND OF THE INVENTION

Many pharmaceutical drug products are sensitive to moisture and require dry storage environment to preserve their activity. Some of the newer drug formulations are also sensitive to ambient oxygen, presence of which in the package can cause rapid oxidation of essential product components, often resulting in a loss of activity and a reduced shelf life of the product. Common pharmaceutical products include tablets, capsules, gelcaps, and other solid single dosage formulations, usually referred to as "tablets". Storage requirements to packaging of many pharmaceutical products often include at least a two year shelf life requirement. A blister pack such as shown in FIG. 1 provides a convenient way to encapsulate an individual tablet between metallic foil and heat sealable plastic sheet, which is thermoformed to create a set of cavities for packaging each tablet in its own individual cavity. Such blister packs allow for dispensing individual tablets from the package without exposing other tablets in the pack to the external environment.

Oxygen present inside the product, the package headspace and the package walls after sealing the package is referred to as residual oxygen. The oxidative deterioration of the packaged product can be slowed and/or delayed by using high "passive" barrier packaging materials and structures and by combining them with modified atmosphere packaging methods such as vacuum packing and/or headspace flushing with inert gas before sealing. The passive barrier to oxygen permeation acts as a physical barrier that reduces or eliminates the diffusive oxygen transport through the container wall but does not chemically interact with oxygen. These methods of protection are often insufficient to provide the required storage duration and prevent the loss of product activity.

Early "active" packaging methods of extending shelf life of oxygen sensitive products by maintaining low oxygen environment inside a package included placing chemically reactive oxygen absorbers inside a package. Materials capable of absorbing oxygen in the course of chemical reactions irreversible at the storage conditions are commonly referred to as oxygen scavengers. Oxygen scavengers enclosed inside the package in the form of separate packets, pouches or sachets reduce the residual oxygen amounts and react with permeated oxygen, however they are unable to prevent oxygen ingress through the container walls via ordinary diffusion. Therefore an additional barrier protection in the form of high passive barrier materials characterized by low oxygen permeability in them is often required. The oxygen permeated through packaging is then competitively consumed by the scavenger and by the oxygen sensitive product. For highly unstable products the excessively high reactivity of the enclosed scavenger with oxygen is often required to prevent preferential oxidation of the packaged product. The potential ingestion of the packets or their contents by pets, children and adult consumers is an issue with the use of packets.

In view of limitations of enclosed oxygen scavengers, it has been proposed to incorporate oxygen scavengers into a packaging material forming container walls. Such structures are referred to as "active barriers" to oxygen permeation because they not only physically restrict the rates of oxygen diffusion across the barrier but also chemically react with permeating oxygen thus further reducing the effective rates of oxygen permeation. Such active barriers are also advantageous because they can potentially absorb oxygen trapped inside the package similar to enclosed absorbers. As noted by Solovyov and Goldman [$Int.\ J.\ Polym.\ Mater.$ 2005, vol. 54, pp. 71-91]; the lowest oxygen transmission rates and the largest barrier improvement are obtained when the rapidly reacting oxygen scavenging species is placed within the highest barrier matrix material, specifically, the material with the lowest oxygen diffusivity in it. The barrier improvement factor is defined as the ratio of the effective oxygen flux through the active barrier layer to that through the passive barrier layer made from essentially the same matrix material. Thus, the barrier improvement factor characterizes the relative permeation rate reduction due to chemical reaction rather than the barrier function of a structure alone. The notion of the effective flux refers to the net diffusive mass transfer rate across the downstream boundary of the barrier (i.e., the boundary exposed to the package contents). PVOH (polyvinyl alcohol polymer), EVOH (ethylenevinyl alcohol copolymer) and certain polyamide resins are the examples of such high passive barrier polymeric materials suitable as polymeric matrixes for loading an oxygen scavenging species and for making highly efficient reactive barriers. However, the oxygen barrier function of PVOH and EVOH materials is known to rapidly degrade as the relative humidity of their environment increases. Therefore, such materials cannot be used alone to form an oxygen barrier structure and they often have to be protected from moisture diffusion by additional water vapor barrier layer(s), e.g., made from polyolefins.

When oxygen is present on both sides of the barrier, the reactive barrier can potentially absorb it from both sides resulting in reduction of residual oxygen amount trapped inside the package after sealing. The condition for this effect to occur was derived by Solovyov and Goldman [ibid.] for homogeneously reactive single layer barrier. Polymeric materials such as PVOH and EVOH suited for making the most efficient reactive barriers to oxygen permeation are in the same time poorly suited as matrixes for rapid absorption of headspace oxygen from inside the package by the loaded scavenger. The reason is that low oxygen solubility and low oxygen diffusion rates in such materials prevent efficient transport of oxygen to the scavenging reactive sites within the matrix. The resulting rates of oxygen sorption into the matrix are too low to efficiently remove residual headspace oxygen. Moreover, these sorption rates are progressively reduced as the oxygen scavenger is consumed or deactivated by the localized reaction-diffusion wave (similar to reaction-diffusion combustion wave consuming solid fuel rod) propagating from inside the package across the reactive wall thickness. There is a need to overcome this problem and to achieve efficient scavenging of both oxygen permeating from the external environment and residual oxygen present in the package after sealing.

In design of pharmaceutical packaging a common way to achieve an ultimate gas barrier is to make individual cavities from metallic foil rollstock sealed to another foil rollstock. To seal the foil package, one or both upper and lower foil rollstocks are usually coated with an adhesive sealant. Such packages are not what is commonly understood as blister packs, as they suffer from the lack of transparency and a well-defined geometrical shape around the encapsulated tablet, in effect forming a minipouch for each tablet. As a result it is not immediately obvious for a consumer to observe whether the individual pouch still contains a tablet or not. On the other hand, thermoformed rigid or semi-rigid transparent plastic sheet heat-sealed to a foil rollstock to form a blister pack such as in FIG. 1, while preferred by consumers due to dispensing convenience and product visibility, forms a blister pack that often suffers from high rates of water vapor and oxygen permeation through the plastic. There is a need to alleviate high oxygen permeability of plastic sheet materials making them suitable for manufacturing extended shelf life blister packs.

In making pharmaceutical blister pack, multiple cavities are formed in the thermoplastic polymer sheet via one of the known thermoforming techniques. When multilayer sheet structures are used to improve gas barrier properties of the blister, the layered structure design, materials selection for each layer, and the thermoforming process parameters such as the sheet preheat time, the forming temperature, the rate of forming and the forming technique have to be adjusted to facilitate deformation of the structure into a desired shape, improve production rates and at the same time reduce film shrinkage and prevent overheating and resulting degradation and thermal decomposition of polymeric layer materials. These goals often require using plastic layer materials with overlapping thermal processing windows, i.e., not every polymeric material pair can be used as a thermoformable substrate for blister packs.

Many organic and inorganic oxygen scavenging compositions and their combinations have been proposed. These compositions are distinguished by whether an organic or inorganic substrate forming a part of the composition is oxidized by permeating oxygen. Inorganic oxygen scavengers are commonly based on oxidation of reduced transition metals, sulfites to sulfates, and other similar chemistries such as U.S. Pat. Nos. 5,262,375 (McKedy 1993), 5,744,056 (Venkateshwaran et al. 1998), 2,825,651 (Loo and Jackson 1958), 3,169,068 (Bloch 1965), 4,041,209 (Scholle 1977). Described organic oxygen scavengers are based on oxidation of carbon-carbon double bonds in polymer chain backbones and pendant groups (ethylenic unsaturation subject to autooxidation), transition metal catalyzed oxidation of certain polyamides, oxidation of certain photo reduced quinones, oxidation of ascorbates, butylated hydroxyanisoles (BHA), butylated hydroxytoluene (BHT), enzymes, certain organo-metallic ligands, and others such as WO 02/076,916 (Horsham et al.), U.S. Pat. No. 6,517,728 (Rooney), U.S. Pat. No. 6,123,901 (Albert), U.S. Pat. No. 6,601,732 (Rooney), WO 04/055,131 (Scully et al.), and WO 02/051,825 (Horsham et al.) While transition metal-based inorganic scavengers often have larger reactive capacities to absorb oxygen per unit weight of the composition, organic oxygen scavengers are preferable in many instances due to their ability to be blended or covalently attached to the passive barrier polymer without introducing undesirable color, loss of transparency, and degradation of mechanical and/or consumer properties of the barrier polymer structure. Depending on the chemical structure of the organic scavenger and the matrix polymer, oxygen scavenging species can be dispersed in the matrix during compounding or covalently bonded to the matrix polymer as described in U.S. Pat. Nos. 5,627,239, 5,736,616, 6,057,013, WO 99/48963 by Ching et al. (1997-2000). The latter arrangement is preferable because low molecular weight oxidation byproducts often present in the barrier after the scavenging reaction completion can migrate into the package and cause undesirable contamination of the product or affect its properties in another negative way. In order to prevent the migration of oxidation reaction byproducts, both the scavenging species and the reaction products are advantageously preferred to be covalently bonded to the matrix polymer. Oxygen scavenging species not bonded to the matrix polymer are also often unsuitable for contact with the product intended for human consumption due to the reasons described above and a respective lack of country-specific regulatory approvals. Such scavenging species often have to be placed into separate layers of the barrier structure that are insulated from the product by passive barrier layer(s) to reduce or prevent byproduct migration.

In U.S. Pat. No. 6,646,175—Yang et al., U.S. Pat. No. 5,350,622—Speer, and U.S. Pat. No. 6,569,506—Jerdee and WO 98/12127 there are materials disclosed with more than one oxygen scavenging layer. In U.S. Pat. No. 6,682,791 McKnight discloses packages and packaging structures with at least two oxygen scavenging materials having different oxygen scavenging properties and arranged as layers within the packaging structure. A difference in oxygen scavenger and/or catalyst concentration between the layers is envisioned.

There remains a need for an oxygen absorbing structure suitable for the rapid (e.g., within hours) absorption of residual headspace oxygen and providing efficient oxygen absorption and a high barrier to oxygen permeation for long term storage (e.g., multiple years) in packaging articles such as blister packs.

SUMMARY OF THE INVENTION

The invention provides a multilayer oxygen absorbing structure comprising at least two reactive oxygen scavenging layers arranged in sequence: a rapidly absorbing highly reactive oxygen-scavenging system, comprising an oxygen permeable matrix polymer and an oxygen scavenger, and a long life layer comprising high passive oxygen barrier matrix polymer, and an oxygen scavenger.

BRIEF DESCRIPTION OF THE SEVERAL VIEWS OF THE DRAWING(S)

Figure 2:
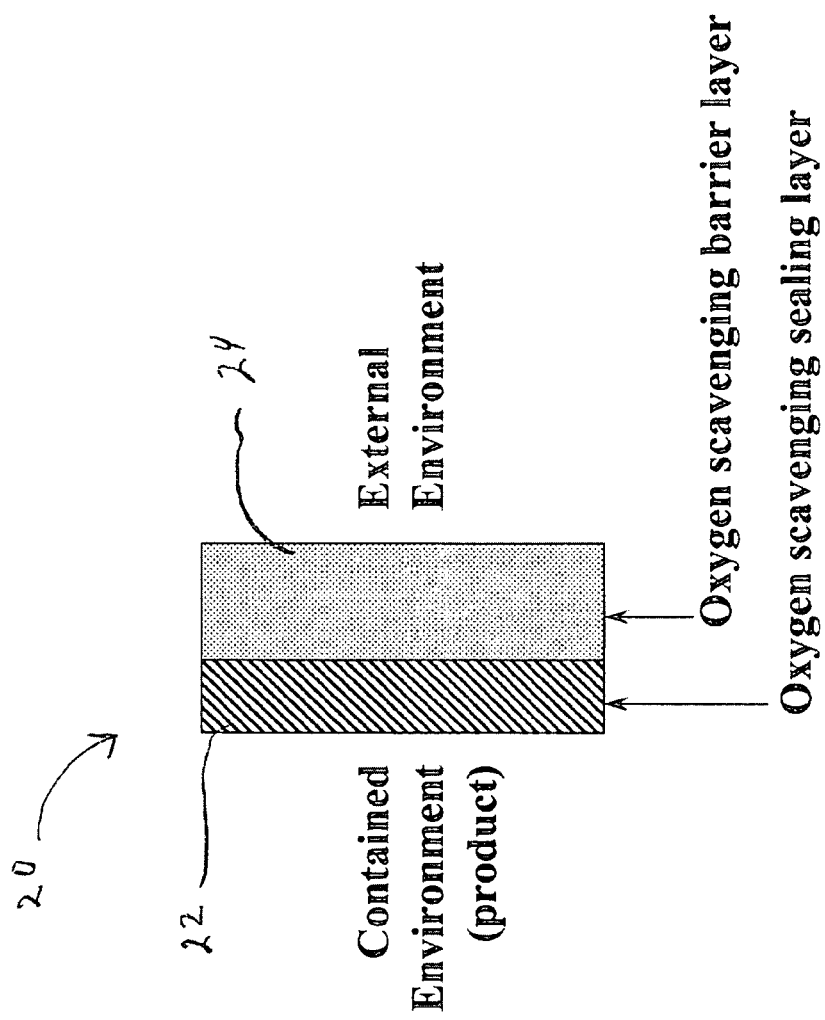
Figure 3:
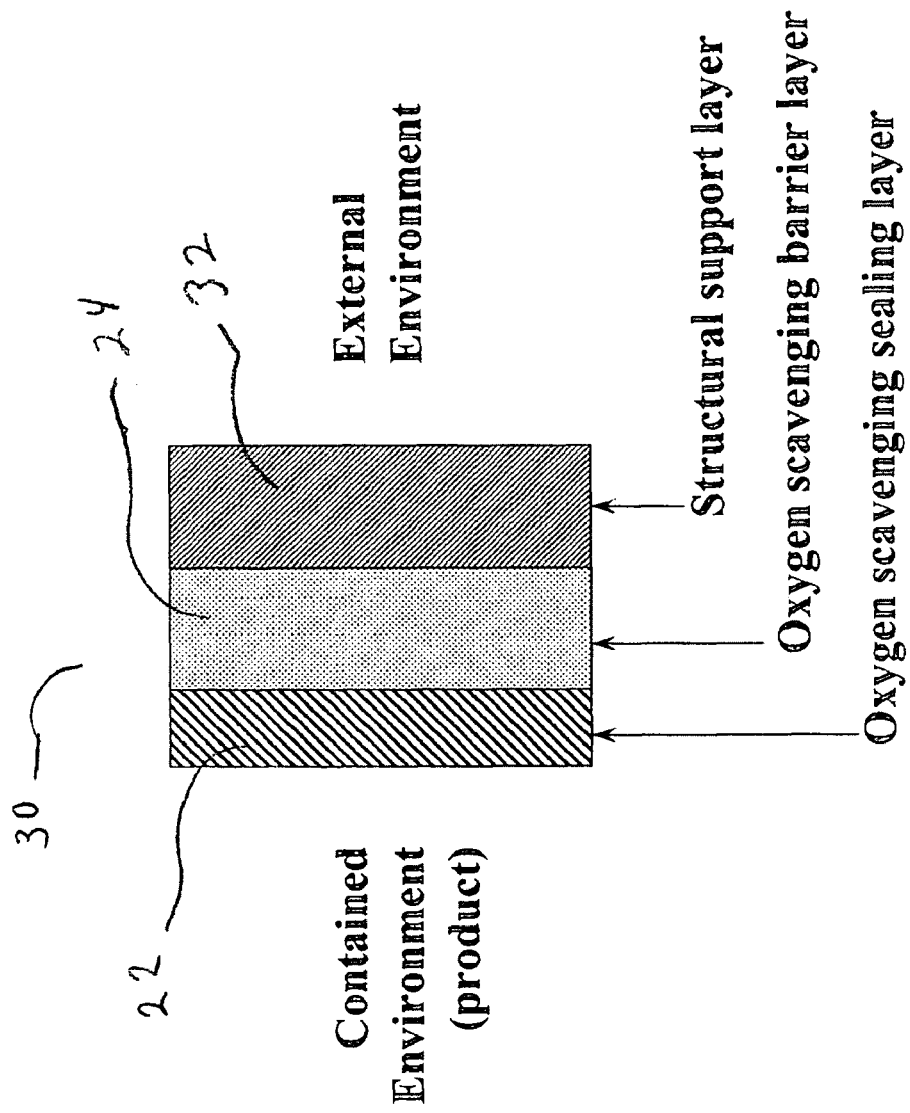
Figure 4:
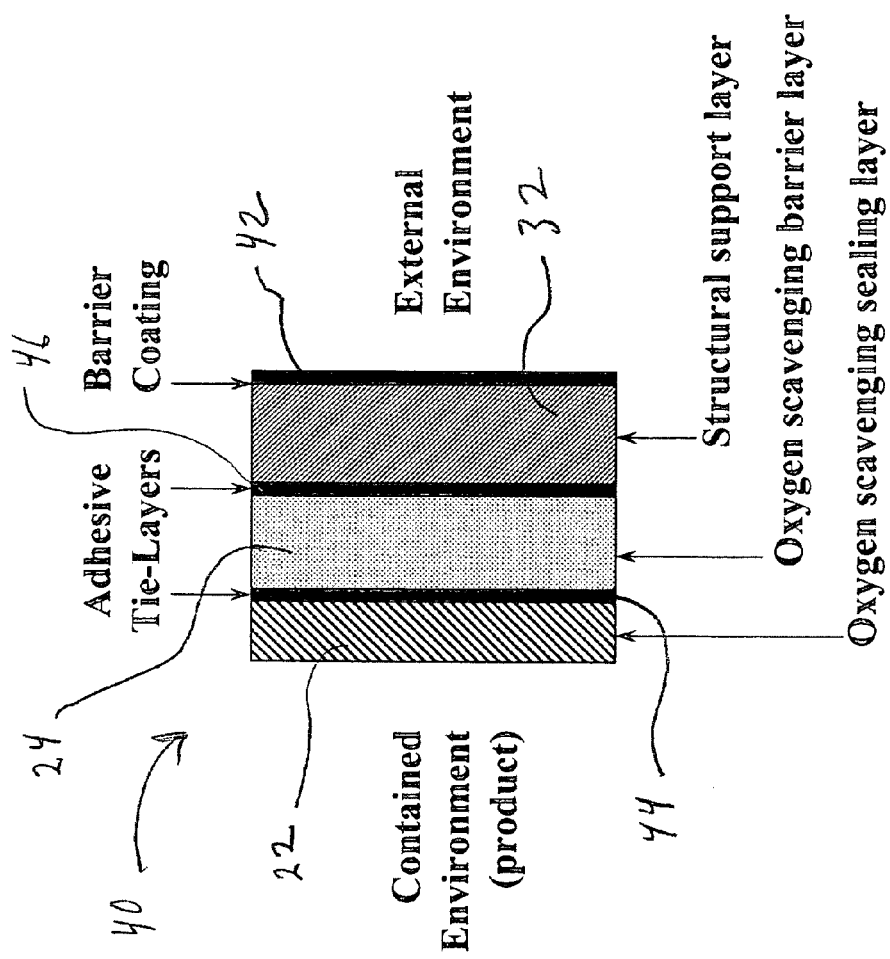
Figure 5:
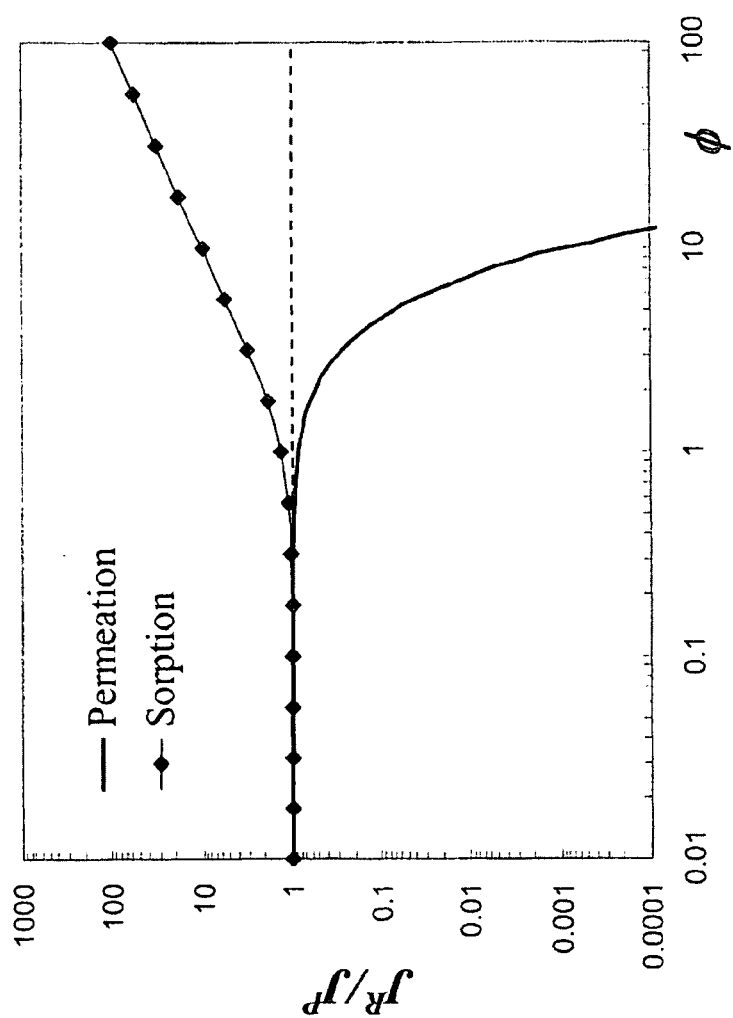
Figure 6:
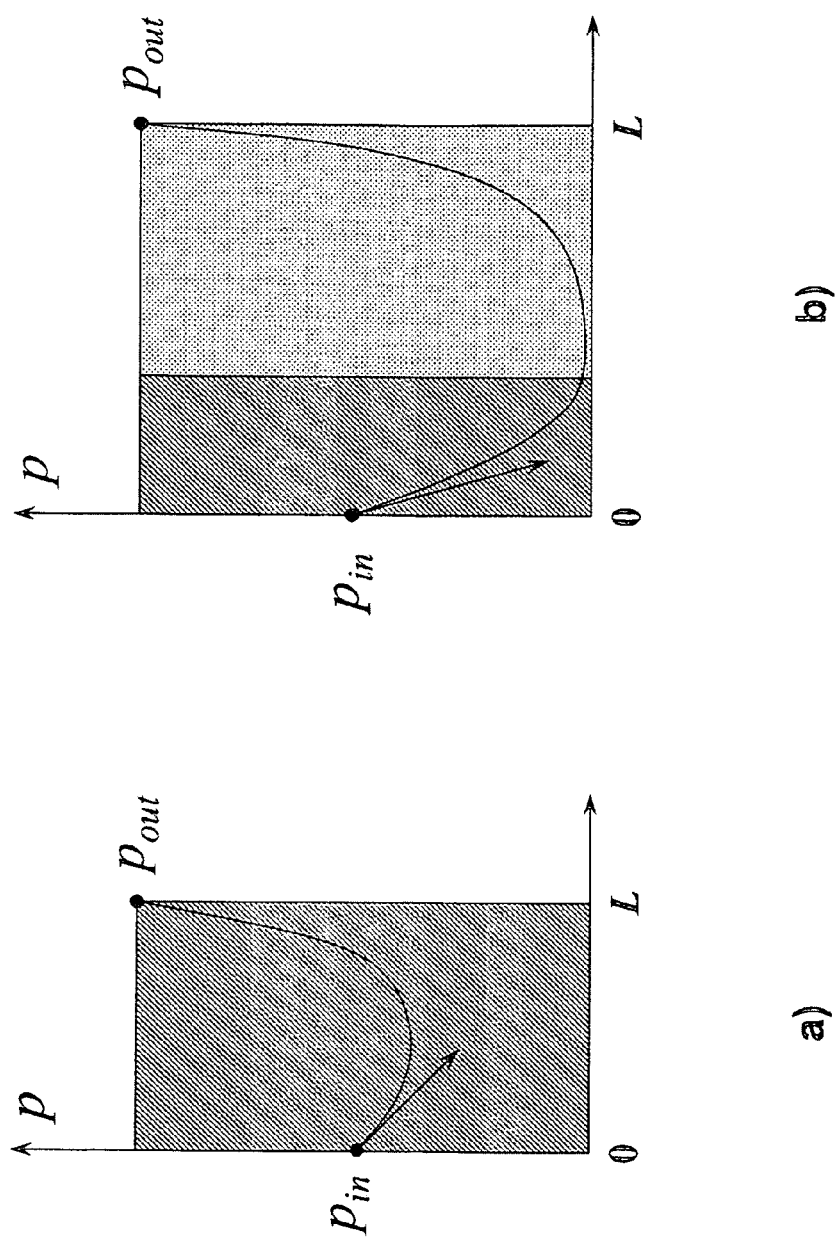

FIG. 1. Typical blister pack structure cross section.
FIG. 2. Two-layer oxygen-absorbing plastic structure.
FIG. 3. Three-layer oxygen-absorbing reactive-reactive-passive plastic structure.
FIG. 4. Three-layer oxygen-absorbing reactive-passive plastic structure with optional adhesive tie-layers, coatings and surface treatments.
FIG. 5. Initial rates of oxygen permeation and sorption in single layer reactive film vs. the film reactivity (the initial Thiele modulus $\phi$ of the reactive layer). All rates are normalized to the steady-state oxygen permeation rate in the passive film with identical oxygen transport properties, including the same matrix material and the film thickness.
FIG. 6. Oxygen partial pressure profiles in (a) single layer reactive and (b) the disclosed two-layer reactive-reactive oxygen-absorbing structures. The two-layer film has a higher rate of oxygen absorption from the package inside and a lower rate of permeation through the reactive barrier layer, as determined from the oxygen pressure curve slopes at the layer interfaces with the package contents and between oxygen-absorbing and oxygen barrier layers, respectively.

DETAILED DESCRIPTION OF THE INVENTION

The teachings of this invention provide a way to design and manufacture packaging structures with dual functionalities of rapid head space absorption and long term barrier to oxygen permeation.

The invention has numerous advantages over prior practices. The invention provides a material structure that provides a high rate of absorption of headspace oxygen. The invention reactive barrier material also provides a long-lasting barrier to oxygen permeating through the invention structure into a package. Further, the invention provides polymer packaging that may be made both nearly impermeable to oxygen and to water vapor. The packaging material further can be formed by typical encapsulation techniques for medicine, food, and electronic components. These and other advantages of the invention will be apparent from the detailed description below.

The invention provides a multilayer oxygen absorbing plastic sheet or film structure comprising at least two reactive oxygen scavenging layers parallel to the film plane arranged in the following sequence: the first rapidly absorbing layer to be placed nearer the packaged product comprised of a highly oxygen permeable matrix polymer combined with a highly reactive oxygen scavenging system, and the second long life layer to be placed nearer the external environment and comprised of high oxygen barrier matrix polymer combined with a highly reactive oxygen scavenging system to form a long-lasting reactive barrier layer with high reactivity toward oxygen. The passive polymeric matrixes of rapidly absorbing layer and oxygen barrier layer are chemically distinct and are characterized by the several orders of magnitude difference in oxygen permeability in them. The oxygen scavenging system and scavenger concentration in both layers can be the same or they can be different depending on the choice of the polymer matrix for the respective layer. In particular, organic UV light activated oxygen scavenging systems independent of the metal based catalysts are advantageously employed in practicing the invention. Specific choices of reactive layer thicknesses, layer matrix materials, and oxygen scavenging systems are described below.

In FIG. 1 there is illustrated encapsulating technique of the prior art. FIG. 1 shows a package that contains a tablet 12. The bottom of the package comprises an aluminum sheet 4. The tablet for use is removed from the package by pushing through the sheet 14. The package 10 is comprised of a thermoformed structural polymer sheet 16 and adhesive sealing layer 18. The transparent polymer sheet 16 typically would be formed from a polymer such as polyesters PET (polyethylene terephalate), PETG (glycol modified polyethylene terephalate), PEN (polyethylene naphthalate), and their blends, PVC (polyvinyl chloride), PCTFE (polychlorotrifluoroethylene), and various polyamides, potentially with water vapor barrier coatings (e.g. amorphous silicon dioxide or PVDC (polyvinylidene chloride)) or layer(s) such as LDPE (low density polyethylene) polymer). The preferred PETG polymer has cyclohexane dimethanol added to the polymer backbone in place of some of the ethylene glycol in order to reduce crystallinity and lower melting temperature to aid thermoforming. The sealing layer 18 typically would be formed of an adhesive material such as ethylenevinyl acetate copolymer, heat sealable acrylic resins and hydroxypropyl cellulose. The sealing layer and the structural layer generally are transparent in the visible light wavelength range. This package while tamper proof and economical to produce and form does not provide significant protection for the tablet from oxygen permeation.

Illustrated in FIG. 2 is a packaging wall structure 20 in accordance with the invention having two oxygen scavenging layers. The wall structure of the invention would be used in a package such as in the prior art of FIG. 1 and substitute for layers 16 and 18. The structure comprises a rapidly absorbing oxygen scavenging reactive layer 22 placed nearer the package interior and characterized by a rapid rate of oxygen absorption into the layer, and long life oxygen scavenging reactive layer 24 placed nearer the package exterior and providing a high reactive barrier to oxygen permeation. The layer 22 typically would also be a sealing layer, for blister pack use such that the sheet could be utilized in the packaging of encapsulated medicines and food. The long life layer 24 acts as a primary passive barrier layer while also having high reactivity with oxygen to further reduce the effective oxygen permeation rates across it. The concepts and definitions of highly oxygen absorbing layer, high reactivity barrier layer are described in the Theoretical Background section below.

Illustrated in FIG. 3 is a three layer reactive-reactive-passive structure 30 in accordance with the invention. Structure 30 is also suitable as a wall for a packaging container and is particularly suitable for use in encapsulating of individual medicine dosages in blister packs. Structure 30 is comprised of layer 22 with rapidly absorbing high rate of oxygen absorption, layer 24 with a high reactivity toward oxygen is made from a long life high passive oxygen barrier material, and a third passive structural support layer 32 provides strength and rigidity to the package and supports the two oxygen scavenging layers of 22 and 24.

Illustrated in FIG. 4 is a section of wall 40, also intended as a sheet for packaging or encapsulating of medicines or food. Wall 40 is composed of the highly permeable rapid absorbing reactive layer 22 with the high rate of oxygen absorption, with the long life oxygen barrier layer 24 comprising a high passive oxygen barrier polymer and an highly active oxygen scavenging material. The passive structural support layer 32 is adhered to the long life oxygen barrier layer 24 with adhesive tie-layer 46. Layers 22 and 24 are joined by adhesive tie-layer 44. In the wall structure 40 of FIG. 4 there is also provided a barrier coating 42 that will provide a further passive barrier to oxygen transmission and/or to water vapor transmission through the structure. The tie-layers 44 and 46 are optional and are only needed if the materials of the layers 22, 24, 32 do not bond to each other well or are separately formed and then joined. The tie-layers are typically formed of any suitable hot melt adhesive.

For the long life oxygen barrier layer comprising a high passive oxygen barrier matrix polymer and a highly reactive oxygen scavenging material the oxygen permeability of the passive matrix material is between 0.001 and 10 cc mm/($m^2$ day atm) at the conditions of use (typically ambient temperature about 20 degrees centigrade and relative humidity of 40-60%). A preferred permeability is less than 2.5 cc mM/($m^2$ day atm). The most preferred permeability range is between 0.01 and 2.5 cc mm/($m^2$ day atm). For the passive material forming the rapid absorbing oxygen-absorbing layer matrix the oxygen permeability is greater than 250 cc mm/($m^2$ day atm) at the conditions of use. Preferred oxygen permeability for the oxygen-absorbing layer matrix material is between 500 and 10,000 cc mm/($m^2$ day atm).

The present invention describes the structural design of a multilayer having at least one rapidly absorbing reactive layer and at least one long life passive oxygen absorbing layer used to form a polymer packaging article suitable for efficient removal of residual oxygen from the package, and reducing or preventing oxygen ingress into the package through the choice of location, matrix material, and reactivity of reactive oxygen-scavenging layers as well as the corresponding structure compositions and the method of manufacturing such a structure. Specifically, the invention is primarily directed to a heat sealable polymeric structure suitable for packaging pharmaceutical and nutraceutical single dosage products in thermoformable blister packs. Those skilled in the art will appreciate the fact that the invention is not limited to pharmaceutical blister packs and that other barrier packaging applications of the claimed structural designs, targeting simultaneous reduction of oxygen ingress into the package and removal of residual oxygen from the package inside, are possible without deviating from the spirit of the invention. Such a method includes the encapsulation of the product to be packaged between two sheets of the invention material. Other such materials are foods, chemicals, electronic components and biologic materials.

The invention is found to attain seemingly contradictory packaging structure design goals of providing a long-lasting reactive barrier to oxygen permeation and simultaneously a means of rapidly removing residual oxygen from the package. This is done through optimized multilayer design of the packaging structure or a part thereof, incorporating at least two reactive oxygen-scavenging polymeric layers in a specific order and made from distinct polymeric materials with essentially different passive oxygen transport properties. The oxygen scavenging system and scavenger concentrations in the reactive layers can be the same or different depending on specific package protection requirements such as a required duration of barrier protection from ambient oxygen ingress, the surface area of the package, the maximum thickness of the packaging structure, the volume fraction of gaseous headspace in the package and the amount of residual oxygen present in the package after sealing.

The rapid-absorbing reactive layer, which is placed nearer or exposed to the package contents, is made preferably from a heat sealable polymer highly permeable to oxygen (such as heat sealable acrylic-based adhesive, modified cellulose-based thermoplastic or ethylene-vinyl acetate (EVA) copolymer hot melt adhesive) which incorporates an oxygen scavenging species dispersed in or preferably covalently bonded to the matrix polymer. Alternatively, such oxygen-scavenging reactive species covalently bonded to some other polymer, that cannot serve as a heat seal alone, can be blended with the said heat sealable polymer base to combine the sealability of the base material with covalently bonded oxygen scavenging functionality, characterized by reduced or negligible migration. In an example of a specific anthraquinone-based oxygen-scavenging species bonded to or dispersed in the sealing layer matrix polymer comprising ethylene vinyl acetate copolymer, such matrix has to have a means of activating the anthraquinone scavenging reactivity via photoreduction mechanism. To achieve that, the matrix polymer is chosen to advantageously contain a large molar fraction of secondary hydroxyl functionalities available for a rapid proton transfer from the hydroxyl group to the ketone oxygen in the anthraquinone. At the same time, the heat sealing matrix has to have high UV light transmission levels in the UV light wavelength range required for efficient scavenger activation.

The rapidly absorbing oxygen absorbing sealing layer serves as a means of removal of residual oxygen via rapid dissolution of oxygen in the polymeric matrix and its rapid diffusion to the embedded oxygen-scavenging species. This layer, which can be solid or porous, is distinct from enclosed oxygen absorbers and internally attached oxygen-scavenger-filled adhesive labels because (1) it contains the oxygen-scavenging functionality permanently bound to the heat sealing polymer matrix or bound to non-heat sealable polymer fraction blended with heat sealing polymer, and thus it is essentially prevented from migration and release of reaction byproducts, (2) it additionally serves as an adhesive heat sealable layer suitable for sealing the package. A preferred oxygen absorbing layer comprises a heat sealable acrylic polymer, ethylene-vinylacetate copolymer (EVA), hydroxypropyl cellulose, other modified cellulose based plastics, or their blends with 0% up to 50% of polyol, polyvinyl alcohol (PVC), or ethylene-vinyl alcohol copolymer (PVOH) by weight blended in.

The long life oxygen barrier reactive layer, placed nearer the exterior of the package, which can be exposed to the external environment or protected from it by a passive polymeric structural layer, is made from high passive oxygen barrier polymer (such as PVOH and EVOH) with reactive oxygen scavenging species dispersed in or covalently incorporated into the matrix polymer. In one embodiment the long life oxygen barrier matrix polymer comprises ethylene vinyl alcohol copolymer with 20-60 mol. % ethylene content. The long life oxygen scavenging layer provides a long-lasting active barrier to oxygen permeation with high reactivity with oxygen, that does penetrate the barrier, resulting in nearly zero oxygen ingress rate into the package until the reactive capacity of the scavenger is exhausted by the reaction. The lower the rate of oxygen diffusion through such a layer, the longer it will take to completely deplete the scavenger reactive capacity and revert this reactive layer into a passive barrier layer. In the example of anthraquinone-based oxygen scavengers dispersed in PVOH/EVOH matrix, the matrix also provides a ready source of hydrogen atoms in secondary hydroxyl groups preferred for efficient UV light induced keto-enol tautomerization of anthraquinone which serves to activate its oxygen scavenging capability. That does not exclude the use of other polymers (such as cellulose based plastics and polyols) containing primary or preferably secondary hydroxyl functionalities as matrixes for loading anthraquinone-based oxygen scavengers. It is preferred to protect the long life oxygen barrier layer by a structural support layer, preferably one that has a water vapor barrier properties as this allows for a thin barrier layer and protects the PVOH/EVOH layers from deterioration of their oxygen barrier properties by water vapor absorption. A preferred barrier layer comprises fully or partially hydrolyzed PVOH matrix with dispersed UV activated organic oxygen scavenging species such as anthraquinone, its 2-sulfonate salts and derivatives designed to improve their solubility in and compatibility with PVOH matrix. The optional third layer (FIG. 3 and FIG. 4), is a material such as for example optically and UV clear PET, PETG, or polyolefin sheet, exposed to the external environment. It is preferably rigid or semi-rigid, and it advantageously serves as a structural support for the metal foil and both reactive layers that are usually produced as thin flexible membranes, protects the moisture sensitive PVOH/EVOH layer from water vapor diffusion and subsequent degradation of its oxygen barrier properties, provides an additional passive barrier to oxygen permeation (thus extending the time of complete scavenger reactive capacity deactivation), and it is thermoformable by conventional techniques. This optional third layer does not have to be homogeneous and it can itself be a multilayer passive barrier structure with additional desirable features such as an improved water vapor barrier, oxygen and water barrier coatings, surface treatments, colors, and printable skin layer.

It is advantageous to have an oxygen scavenging polymeric material whose reactivity can be activated or triggered on demand by some external source. This way the full reactive capacity of the scavenger to consume oxygen can be preserved until it is actually used in the package placed in storage. Transition metal based oxygen scavenger activity is often triggered by moisture diffusion, while many organic oxygen scavenging chemistries are designed to be triggered by exposure to actinic radiation in the UV range. In order to achieve a high degree of activation of such scavengers, the structure is preferred to be highly transparent to the UV light wavelengths that trigger photoreduction of a specific scavenging chemistry. Low degrees of scavenger activation result in a large fraction of reactive functionalities left unusable for oxygen scavenging purpose. That reduces the available activated capacity and increases the overall cost of the scavenging composition per package. Preferred oxygen scavenging materials are the anthraquinone-based oxygen-scavenging compositions that can be efficiently photo reduced by exposure to the UV light wavelengths below 380 nm preferably in the presence of secondary hydroxyl functionalities in the matrix polymer without any transition metal based catalysts being present. The observed 60-80% efficient keto-enol tautomerization of anthraquinone upon photoreduction leads to formation of multiple reactive sites suitable for rapid and efficient scavenging of permeating oxygen molecules. In one particular embodiment, derivatized anthraquinone-based functionalities can be advantageously covalently bonded to acrylic polymers usable as heat sealing materials.

The invention embodies structural designs of oxygen scavenging barrier packaging that (1) serve dual purposes of reducing or eliminating oxygen ingress through container walls for a significant time duration (for example, from several months to 2-3 years) and rapidly scavenging residual oxygen left in the package after sealing (for example within several hours), (2) allow for efficient activation of scavenging reactivity by UV light exposure, (3) have oxygen-scavenging capability independent of both moisture diffusion and transition metal catalysts, (4) can be heat sealed to other substrates to form more complex packaging structures, (5) can be thermoformed by conventional techniques.

The two described, rapidly absorbing and long life, distinct oxygen absorbing layers can be solution coated, laminated, cast or coextruded on the structural support layer or on a removable rollstock substrate (for a later use as a part of other engineered barrier structures). Oxygen scavenging capability of both oxygen absorbing layers can be activated on demand by an external source provided the incorporated oxygen-scavenging composition allows for activation of its reactive capacity. Depending on the chemical nature of the oxygen-scavenging agent, the oxygen-scavenging functionality can be activated through different mechanisms in each layer of the oxygen absorbing structure. Actinic radiation in the UV range (200-400 nm) is a preferred activation method that can advantageously provide a rapid through-the-thickness activation of dispersed oxygen scavenging species in both reactive layers simultaneously. Activation by the near-UV wavelengths (350-400 nm) is preferred due to wide commercial availability and lower cost of such UV sources. The preferred oxygen scavenger is anthraquinone, anthraquinone 2-sulfonate sodium salt, and/or another anthraquinone derivative with functionality allowing covalent bonding of anthraquinone group to an acrylic polymer base. This preferred oxygen scavenger is conveniently activated in the preferred near-UV range. The anthraquinone oxygen scavengers are preferred because of the ease of activation and their ability to bind with the matrix polymers.

The described two-layer reactive-reactive and three-layer reactive-reactive-passive plastic structures are preferably manufactured by wet coating of aqueous solution of PVOH polymer with dispersed anthraquinone-based oxygen scavenging species onto the structural support layer (such as clear PET sheet) with subsequent drying in a convection oven or heat tunnel. The dried PVOH layer is preferably over coated with the oxygen-scavenging acrylic layer (from solution or melt) via suitable slot die, curtain coater, extrusion coating or a similar technique. The sealing oxygen absorbing layer preferably contains an anthraquinone-based oxygen scavenger functionality covalently bonded to the matrix polymer to prevent migration of oxidation byproducts into the sealed package. Without deviation from the spirit of the invention, the thermoformable substrate surface treatments, barrier coatings, adhesive tie-layers, adhesive primer coatings, and the like can be used between the structural layers to improve interlayer adhesion and passive barrier properties of the structure. The oxygen absorbing structure of the invention is suitable to be activated, thermoformed, filled and sealed in-line on the same packaging line, resulting in reduced blister pack production costs in addition to the described benefits.

The polymer layers forming the layers of the invention materials of the invention may contain known polymer additives not significantly affecting the oxygen barrier and scavenging properties. Such known additive and residual materials including compatibilizers, processing aids, colorants, biocides, fungicides, residual solvent, plasticizers, tacktifiers, slip agents, residual hardeners and cross-linking agents may typically be present.

Theoretical Background

The permeability P of an isotropic passive barrier material to a specific permeant such as oxygen gas is usually defined as a product of the kinetic oxygen diffusivity coefficient D and the thermodynamic oxygen solubility coefficient S in the material:

$$P = DS \tag{1}$$

At a specific temperature, relative humidity (RH), and oxygen partial pressure difference $\Delta p$ across the barrier. Then the measured steady state oxygen transmission rate TR across a barrier with the uniform thickness L can be predicted as:

$$TR = \frac{P}{L} \tag{2}$$

The oxygen flux J (the oxygen mass flow rate across the unit surface area of the passive barrier) is defined as:

$$J = TR \cdot \Delta p = \frac{P}{L} \Delta p \tag{3}$$

Where $\Delta p = p_{out} - p_{in}$ is the oxygen partial pressure difference on the opposite sides of the barrier, outside and inside the package, respectively. When both upstream and downstream oxygen pressures are maintained constant, the steady state permeation pattern results in the passive layer after a certain delay called a lag time. In steady state the time-independent oxygen concentration profile exists across the uniform homogeneous passive layer. At such steady state conditions, the rate of oxygen sorption into the layer is equal to the rate of oxygen permeation through the layer and respectively equal to the rate of oxygen ingress into the downstream environment. The reactive oxygen scavenging species present in the passive layer material change the steady-state permeation pattern to a transient (time dependent) behavior which persists in the reactive layer until its reactive capacity is depleted by reaction with permeating oxygen. The higher the layer reactivity with oxygen, the faster the rate of oxygen sorption into the layer and the lower the rate of oxygen permeation across the layer will be compared to the passive layer.

The instantaneous reactivity of a uniform homogeneously reactive oxygen-scavenging barrier with thickness L is described by the dimensionless initial Thiele modulus $\phi_0$ of the reactive layer [Solovyov S. E. *J. Phys. Chem.* 82004, vol. 108, pp. 15618-15630]:

$$\phi_0 = L\sqrt{\frac{k_0}{D}} \quad (4)$$

where $k_0$ is the initial pseudo first order reaction rate constant for the fully activated reactive layer, which in turn depends on the overall stoichiometry $\mu$ of the scavenging reaction (in moles of oxygen consumed by a mole or a unit weight of the scavenging composition), the actual overall forward reaction rate constant K between oxygen and the scavenging species in the absence of diffusive limitations on the bulk reaction rate, and the initial concentration $R_0$ of the scavenging species in the matrix material. For commonly observed bimolecular oxygen scavenging reactions of the second order overall, this initial rate constant is expressed as:

$$k_0 = \mu K R_0 \quad (5)$$

The dimensionless Thiele modulus relates the rate of reactive absorption of oxygen within the layer to the rate of oxygen diffusion across the layer. Large initial Thiele moduli $\phi_0 \gg 1$ of the reactive layer correspond to the case of fast, diffusion-controlled reactions that efficiently remove (intercept) permeating oxygen during its transport across the barrier. The performance of such reactive barrier to oxygen permeation is characterized by the barrier improvement factor. For the case of zero oxygen pressure inside the package $p_{in}=0$, the initial barrier improvement factor $\gamma_0$ relates the steady-state oxygen flux $J^{ss}(P)$ through the passive barrier to the initial effective oxygen flux $J_0(R)$ across the downstream boundary x=0 of the activated reactive barrier with the same passive transport properties as [ibid.]:

$$\gamma_0 \equiv \frac{J^{ss}(P)}{J_0(R)} = \frac{\sinh(\phi_0)}{\phi_0} \quad (6)$$

At the same conditions the initial sorption rate improvement factor $\gamma_L$ for oxygen sorption into the reactive layer upstream boundary x=L, for the case of catalytic oxygen absorber that is not consumed in the reaction:

$$\gamma_L \equiv \frac{J^{ss}(P)}{J_L(R)} = \frac{\tanh(\phi_0)}{\phi_0} \quad (7)$$

For highly reactive scavenging systems forming reactive layers with large $\phi_0$: $\tan h(\phi_0) \to 1$; therefore for high barrier materials with low oxygen solubilities in them, the steady-state rate of sorption increases in linear proportion to $\phi_0$, if the scavenger has an excess reactive capacity, i.e. it temporarily acts as a catalyst. That rate is often not sufficient to provide an efficient oxygen sorption into the reactive layer for any significant time duration, since it requires too much excess reactive capacity, compared to headspace oxygen amount to be removed, to be sustained. In many applications, providing such an excessive capacity is uneconomical. In order to provide rapid residual oxygen removal by the oxygen-absorbing layer without excess reactive capacity, layer matrix materials with high oxygen solubility and diffusivity are preferred. Even though high oxygen diffusivity in a polymer matrix reduces the initial layer reactivity $\phi_0$, a higher oxygen mobility in such matrixes makes all oxygen scavenger species distributed in the layer easily accessible to diffusing residual oxygen. As a result such a layer with a highly permeable matrix will efficiently remove residual oxygen through rapid sorption and reaction with the activated scavenger throughout the thickness of the sealing layer As FIG. 5 demonstrates, the rate of oxygen permeation in catalytic reactive barriers is exponentially reduced with the layer reactivity $\phi$; however the rate of oxygen sorption into the layer is only linearly proportional to its reactivity (compare equations 6 and 7). Therefore, reactive layers with high reactivity, characterized by large initial Thiele moduli $\phi_0$ (for practical purposes with $\phi_0 > 3-5$) are especially well suited as oxygen barrier layers. High reactivity of the layer results in significant barrier improvement over passive or inactivated layer matrix. Reactive layers with $\phi_0=10$ result in effective permeation rates 1000 times smaller than the layer with only passive polymer matrix can provide, thus making the reactive layer nearly impermeable to oxygen. The barrier improvement is measured relative to passive transmission rate of the layer, hence, improving passive barrier of the reactive layer by matrix polymer selection or modification results in improved reactive barrier performance on top of increased passive barrier performance. The result of using higher passive barrier polymer as a layer matrix for adding oxygen scavenger to is synergistic improvement in overall barrier performance of such layer. The corresponding practical teaching of this invention is that in order to create an ultimate reactive barrier layer, one need to select the highest possible passive oxygen barrier matrix material for a layer and then add oxygen scavenger with the highest reactivity (bulk reaction rate constant with oxygen) to it. Designs using low oxygen scavenger concentrations or lower activity scavenging systems to create a reactive barrier layer (such as claimed by McKnight in U.S. Pat. No. 6,682,791) are inefficient at best. With reducing the scavenger concentration or scavenger activity in such barrier layers, the initial Thiele modulus of the layer is proportionally reduced resulting in exponential decrease in the barrier improvement. According to formula (4), the matrix material used for barrier layer with lower oxygen diffusivity in it contributes to increase in the initial reactivity of the layer. The result of such material selection for the barrier layer is a dramatic increase in reactive oxygen barrier improvement on top of the lower oxygen transmission rate through such higher barrier passive matrix. This disclosure forms a basis for robust design of highly efficient reactive barrier layers.

FIG. 6 shows steady-state oxygen pressure profiles in single layer reactive film (a) and in the disclosed two-layer reactive-reactive film with oxygen-absorbing and oxygen barrier layers. Increasing the reactivity of oxygen barrier layer (e.g., via increasing its thickness, oxygen scavenger concentration in it, or degree of scavenger activation) with simultaneous improving of its passive barrier properties (via lower oxygen diffusivity and solubility in the layer matrix) achieves the goal of superior barrier function of such reactive layer at the expense of reducing the rate of oxygen absorption into such a layer. In order to improve oxygen sorption characteristics of reactive oxygen scavenging layers in practice, the finite reactive capacity of consumable oxygen scavengers and the associated costs of adding such a capacity to a reactive layer with limited thickness have to be addressed. In such consumable systems, no steady state sorption exists at any time during the duration of scavenger reactive capacity depletion. The following disclosure describes how to improve transient (time-dependent) oxygen sorption characteristics of reactive layer for rapid removal of residual oxygen from the package interior.

In a case of non-catalytic oxygen scavenger, that is consumed during its stoichiometric reaction with oxygen, loaded into a layer that has a large initial reactivity $\phi_0$, the scavenging reaction is known to proceed in the form of a localized reaction-diffusion wave propagating across the layer thickness from the layer boundary and consuming all the scavenging reactive capacity in its wake. All currently known oxygen scavengers are consumable, i.e., non-catalytic overall even if they are catalyzed by a third species.

The time-dependent position $L_u(t)$ of a narrow reaction-diffusion wave front propagating upstream across the non-catalytic reactive barrier from the package interior and consuming the scavenger is expressed as:

$$L_u(t) = \sqrt{\frac{2DSp_{in}t}{\mu R_0}} \quad (8)$$

where $p_{in}$ is the fixed or slowly changing partial oxygen pressure inside the package. When the reaction-diffusion wave reaches the position $L_u(t)$ after time t, the total amount $Q^{NC}(t)$ of oxygen consumed by the surface area A of the layer during that time is found as:

$$Q^{NC}(t) = \mu R_0 A L_u(t) = A\sqrt{2\mu R_0 DSp_{in}t} \quad (9a)$$

On the other hand, utilizing result (7) and assuming high reactivity $\phi_0 \gg 1$ of the catalytic (or, comparably, excess capacity) reactive layer, the total amount $Q^C(t)$ of oxygen catalytically removed by the surface area A of the layer is found as:

$$Q^C(t) = ASp_{in}\sqrt{\mu K R_0 D \cdot t} \quad (9b)$$

In both cases of non-catalytic and catalytic reactive oxygen absorbing layers (results (9a) and (9b) respectively), the larger oxygen diffusivity D and solubility S in the reactive layer matrix are both advantageous for faster reaction wave front propagation (in non-catalytic layer) and for respectively faster absorption of residual oxygen in the course of diffusion-controlled rapid scavenging reaction. Therefore, the practical teaching of this invention for making efficient oxygen-absorbing layer for removal of residual oxygen is to use the polymer with the highest oxygen permeability P=DS in it as a matrix for loading highly reactive oxygen scavenging system. The high initial reactivity $\phi_0$ of oxygen-absorbing layer with $\phi_0 > 3-5$ is still required to practice the invention. Otherwise, the oxygen removal by either catalytic or non-catalytic scavenging reaction will not be efficient and the rate of removal will be unacceptably slow (as shown in FIG. 5 for the rate of sorption). Given a certain bulk reactivity of a specific oxygen scavenging system (the bulk rate constant K), the choice of polymeric matrix material and its thickness for loading the scavenger to satisfy the layer design requirement $\phi_0 > 3-5$ can be easily determined by those skilled in the art according to definitions (4) and (5).

At the same time the rate of permeation across the barrier exponentially decreases with the increasing $\phi_0$ according to result (6), therefore the materials with the lowest possible oxygen solubility and diffusivity are preferentially selected for oxygen scavenger loading into them to create an efficient barrier to oxygen permeation. Low oxygen mobility in the polymer matrix (via a lower diffusivity coefficient) increases the oxygen molecule residence time within the barrier layer and thus is believed to increase the probability of oxygen reaction with the distributed reactive oxygen-scavenging species. Low oxygen solubility in the matrix reduces concentrations of dissolved oxygen in the matrix and therefore extends the time until the scavenger reactive capacity is depleted by the reaction with stoichiometric amount of oxygen.

Structural Design

An oxygen scavenger in a polymer is usually a complex chemical system for absorbing oxygen. While it is possible to imagine a single material that behaves as oxygen scavenger, most scavengers are complex systems involving many different components. Some scavengers are insoluble in polymers, i.e., they exist separately from the polymer matrix, and are activated without any help from the matrix (like inorganic iron-based powders): such systems can be said to be self-contained. Organic scavenging systems may require catalysts, initiators, proton donors, and inhibitors in addition to oxidizable substrate. Even if such systems are self-contained, their bulk reactivity with oxygen in their "pure" form is mostly irrelevant to their reactivity while embedded in polymeric layers. Bulk reactivity of pure self-contained systems is usually impossible to quantify accurately because it depends on the physical form of the self-contained scavenging system (liquid, resin, powder, particle size, shape, morphology, structure, test conditions of exposure to gaseous oxygen, etc.). What matters in use is the system reactivity in polymer: this reactivity is between a complex scavenging system and oxygen dissolved in a polymer matrix (rather than in gaseous state). In such situation, the constant K in polymer could be very different from K in gas phase (that's why the latter is irrelevant). Therefore no fixed K values can be specified even for "pure" scavenging systems, but they can be back calculated from permeation data for scavengers embedded in specific polymer matrixes. Thus, the role of polymer matrix is important in describing the scavenger reactivity. In other words, without specific polymer matrix and knowledge of physical form of the specific scavenger system, the high or low reactivity of scavenger itself cannot be defined. What can be both defined and measured is the reactivity of the reactive layer containing the scavenger (i.e., its initial Thiele modulus), namely, the effective reaction rate can be related to the passive oxygen transport properties of the surrounding matrix.

In rapidly absorbing low barrier (highly permeable) matrix the oxygen diffusion is fast, therefore for scavenging system to be "highly reactive" it must react with oxygen even faster than oxygen diffuses through the matrix. In high barrier long life matrix the oxygen diffusion is slow, hence the scavenging system, which would be unacceptably slow in a low barrier matrix, now can react fast enough to be faster than the slow rate of diffusion: that makes this scavenger "highly reactive" in this particular high barrier matrix, although the same scavenger in low barrier matrix will not be described as highly reactive. All reference to highly reactive scavengers should be understood in view of the above (i.e., as inseparable from the passive oxygen transport properties in the matrix).

In the preferred anthraquinone-based scavenging systems the "system" is not complete nor can it be activated without hydroxyl functionalities present in the matrix. Thus, scavenging system does not exist in "pure" state and its reactivity is affected by the proximity and concentration of available hydroxyl groups around anthraquinone oxygen scavenging sites. That fact makes PVOH and EVOH polymers with multiple hydroxyl functionalities especially suitable as matrixes for anthraquinone-based oxygen scavengers.

In view of the described fundamentals of reactive-diffusive mass transport in barrier and oxygen-absorbing layers, the invention discloses the combination two-layer reactive-reactive barrier structure or substructure where each reactive layer serves a different purpose (FIG. 2). The first rapidly absorbing layer exposed to the package contents comprises a polymeric matrix with high oxygen permeability P=DS, loaded with highly reactive oxygen scavenger. The scavenging species is preferably covalently bonded to the matrix polymer or one of the matrix polymeric components if the matrix comprises a polymer blend. This way the scavenging species and preferably oxidation reaction byproducts remain bonded to the matrix and as such cannot migrate outside the barrier and negatively affect the product or its environment. Alternatively, the scavenging species can be dispersed in the matrix during melt compounding stage, provided the measured level of migration (leaching) of the scavenging species and/or its oxidation reaction byproducts does not exceed country-specific regulatory guidelines.

In order to serve as a sealing layer, the first reactive layer advantageously comprises a heat-sealable resin or a polymer blend with a heat-sealable resin. Known hot melt adhesives such as EVA copolymer resins with moderate to high vinyl acetate content can be used as matrixes or matrix components of the heat seal. Acrylic heat-sealable resins such as poly (HEMA) [poly(2-hydroxyethyl methacrylate)] and poly (HPA) [poly(2-hydroxypropyl acrylate)] also advantageously allow for covalent bonding of anthraquinone derivatives that are capable to serve as photo reducible oxygen scavengers in the presence of primary and secondary hydroxyl groups available in the mentioned acrylic resins.

The second long life reactive oxygen barrier layer immediately follows the first high rate of oxygen absorption reactive layer or it can be optionally joined by a thin adhesive tie-layer for improved interlayer adhesion. The second long life reactive layer comprises a polymeric matrix with low oxygen permeability (at least 2-3 orders of magnitude lower than oxygen permeability of the sealing layer matrix at the conditions of use) loaded with the dispersed oxygen scavenging species or, alternatively, covalently bonded oxygen scavenging functionality. In a preferred embodiment the oxygen permeability of polymeric material forming the oxygen absorbing layer is at least 100 times higher than the oxygen permeability of the oxygen barrier layer for the effective long-term oxygen barrier protection. When the first reactive layer is based on photo reducible anthraquinone-based oxygen-scavenging chemistry, it is advantageous to have a similar oxygen-scavenging chemistry in the long life second layer in order to activate reactivity of both layers by using the same external activating source. The notion of activation by the same source also advantageously applies to any other oxygen scavenging chemistry that can be used in both reactive layers. Therefore, the preferred embodiment for the second reactive layer is to make it from a high oxygen barrier PVOH or EVOH resin with dispersed anthraquinone-based oxygen-scavenging functionality activated by actinic radiation in the UV or near-UV range. In a preferred structure the EVA copolymer contains 8-35% of vinyl acetate by weight to provide substantial adhesive properties.

The two rapidly absorbing and long life described reactive layers can be made very thin (which is cost advantageous given the high relative cost of oxygen-scavenging components) and still meet the extended storage and residual oxygen removal requirements. A preferred thickness for each of the rapidly absorbing layer and the long life layer is between 0.1 and 2 mil (2.5 and 50 micrometer) and between 1 and 5 mil (25 and 125 micrometer), respectively, for good oxygen barrier performance. In such a case the two-layer structure often will not have the necessary rigidity to make a dimensionally stable thermoformed cavity. In order to make thermoformable structure with the required dimensional stability of the cavity it is advantageous to have the third passive polymeric layer exposed to the ambient atmospheric environment as a part of the structure (FIG. 3). This third layer serves as a thermoformable structural support for the reactive layers as well as comprises an additional passive barrier to oxygen and moisture permeation. In a preferred embodiment the thickness of the third layer is between 1 and 20 mil (25 and 500 micrometer) before forming and said layer is a structural support layer. The partial oxygen pressure drop across this passive structural layer results in a lower oxygen pressure $p_{out}$, at the upstream boundary of the second reactive layer compared to the partial oxygen pressure in ambient atmosphere. The resulting duration of the reactive barrier phase is respectively advantageously extended according to the result of Siegel and Cussler for the lag time $t_{LR}$ extension in stoichiometric reactive barriers to gas permeation with uniform scavenger distribution across the barrier thickness [*J. Membr. Sci.* 2004, vol. 229, p. 33].

$$t_{LR} = \frac{L^2}{2D} \frac{\mu R_0}{S p_{out}} \quad (10)$$

Both lower oxygen diffusivity D and solubility coefficient S in the reactive layer matrix, larger loaded reactive capacity $\mu R_0$ (higher concentration of activated reactive species), lower external partial oxygen pressure $p_{out}$, and larger reactive layer thickness L help extend the lag time in the reactive barrier layer.

Clear PET (polyethylene terephthalate), PEN (polyethylene napthalate) and PET-PEN (polyethylene terephthalate-polyethylene napthalate) blends, suitably treated by corona discharge to promote adhesion or coated by adhesion-promoting primer on the reactive barrier side and possibly by moisture barrier treatment, coating, or lamination on the side exposed to ambient atmosphere, can be used as the polymer layer for the passive structural support layer.

The optional third passive layer has to allow for efficient activation of the oxygen scavenger in both reactive layers through the chosen scavenger activation mechanism. In case of anthraquinone-based oxygen scavengers in both reactive layers activated by UV light exposure, the third passive layer is advantageously made to be transparent in the activating UV wavelength range Examples of such UV-transparent materials include PET and PEN homopolymers and their copolymers. Lower oxygen transmission rate in the third passive barrier layer will also reduce the partial oxygen pressure at the upstream boundary of the reactive barrier layer 2 of the structure and thus help extend the lag time due to reaction in this barrier layer. In pharmaceutical blister packaging, the expected shelf life of many medicines is expected to be at least 2 years. The embodiments of the disclosed invention describe particular designs suitable for providing oxygen-free atmosphere in each blister cavity for at least 2 years at the typical storage conditions.

The loading of an effective amount of oxygen scavenging species into the first rapidly absorbing reactive layer targeted for residual headspace oxygen removal is determined by the residual oxygen amount in the sealed cavity (through the partial oxygen pressure in the cavity volume), the exposed surface area of the barrier, the reactive layer thickness, the reactive species capacity to absorb oxygen, and the desired time to remove residual oxygen. The loading of an effective amount of scavenger into the second long life reactive layer targeted for interception of permeating oxygen is determined by the scavenger reactive capacity, oxygen permeability of polymeric matrix, the layer thickness, the partial oxygen pressure in the external environment, and the desired time to prevent oxygen permeation through the second layer, according to equation (10).

The manufacturing method for making the disclosed structure strongly depends on the choice of layer materials. In case of using the optional third passive layer as a structural support and additional oxygen barrier, the two reactive layers with oxygen scavengers can be solution-coated, extrusion-coated, cast or laminated on the structural support layer without deviating from the spirit of the invention. In a preferred embodiment the long life oxygen barrier layer is formed by preparing an aqueous solution of 10-20% by weight PVOH and 1-2% by weight of suitable anthraquinone salt (thereafter denoted as AQ) by sequentially dissolving AQ and PVOH in water or water-alcohol mixture, allowing the simultaneous control of AQ/PVOH weight ratio in the solution and the solution viscosity to control the wet coating process and coating drying time. It is also preferred although not required that the rapidly absorbing layer be formed from an aqueous solution to facilitate production process arranged as two-stage coating procedure. Extrusion coating, casting and lamination of the oxygen-absorbing sealing layer on the oxygen barrier layer can also be practiced with the invention framework.

The preferred embodiments of specific compositions of the oxygen-absorbing structures and their manufacturing methods are described in the following examples.

Example 1

Currently available oxygen permeability analyzers are commonly designed for using the carrier gas method [ASTM D1434-82]. The carrier gas method of oxygen transmission rate measurement involves placement of a film sample in a sealed chamber and providing pure oxygen gas flow along one side of the film (upstream) and a carrier gas flow (usually ultrapure nitrogen gas) along the other side of the film (downstream). The carrier gas picks up any oxygen amounts permeated downstream and carries it to the oxygen detector, thus allowing to measure the instantaneous permeation rates. This method does not allow for simultaneous measurement of oxygen permeation through the barrier and of residual oxygen absorption from the package headspace. In order to prove the dual functionality of the invention, two separate tests were performed on sample substructures to evaluate distinct functionality of each layer separately. The reported layer thicknesses in "mils" commonly used in the US refer to the 1/1000th of an inch (1 mil=25.4 micron).

The manufacturing process was performed in a facility with UV light from light sources filtered out. A 7-10 mil (177-254 micrometer) thick clear PET sheet was coated with 10-20 mil (254-508 micrometer) thick 10-20 wt. % aqueous PVOH solution containing 80-85 wt. % of 90% hydrolyzed PVOH and 10-15 wt. % of anthraquinone 2-sulfonate sodium salt (thereafter abbreviated as AQ). The described coating composition contained 0-5 wt. % of glycerin (based on total solids in dry coating) as a plasticizing agent for improving the dry coating flexibility. The wet coating was subsequently dried to 1-2 mil thick dry PVOH-AQ coating in a convection drying oven or continuous drying heat tunnel. This substructure was tested separately in order to evaluate its reactive barrier performance by measuring its oxygen transmission rate upon AQ oxygen scavenger activation by 5-15 second exposure to the commercial UV source (F300S from Fusion UV Systems Inc., Gaithersburg Md. running at full power of 1.8 kW) from both sides and subsequently exposing the PET side to 100% oxygen at 1 atmosphere. The measured initial oxygen transmission rate was 0.0 cc/(m$^2$ day) at 0% RH and 0.0 cc/(m$^2$ day) at 50% RH at 100% oxygen at 1 atmosphere upstream and 23° C. (the actual measured transmission rates were slightly negative due to absorption of minor amounts of residual oxygen from the nitrogen carrier downstream, resulting in measured rates below the zero baseline established for nitrogen carrier alone). The estimated activated oxygen scavenging capacity of the reactive oxygen barrier layer was 6-8 cubic centimeters (cc) of oxygen per cc of coating. Based on oxygen transport properties of the used PVOH resin and PET sheet, that capacity was calculated to be sufficient to provide two year reactive lag time until all reactive capacity of the two-layer structure is depleted by oxygen permeating from the ambient atmosphere.

In the second test, the clear passive 7 mil thick PET substrate was extrusion coated with 1 mil thick poly(HEMA) acrylic resin covalently bonded with 10-20 wt. % of the anthraquinone 2-sulfonate. This substructure was activated by 5-15 second UV light exposure from the coated side in order to evaluate the efficiency of residual oxygen absorption. The initial 20.5 vol. % oxygen in ambient atmosphere contained in the 10 mL package headspace with the substructure surface area of 100 cm$^2$ exposed to the package inside was reduced to less than 0.2 vol. % within 12-48 hours as measured by MOCON headspace oxygen probe (Modern Controls Inc., Minneapolis Minn.). This test demonstrated the capability of the high rate of oxygen absorption layer to rapidly reduce the residual oxygen amounts inside the package to the levels safe for extended storage of oxygen sensitive products.

The overall three-layer reactive-reactive-passive structure was thus found to be suitable for simultaneous rapid removal of residual oxygen and essentially preventing oxygen ingress from the atmospheric environment during 2 years to maintain oxygen-free atmosphere inside the package. The final three-layer structure was produced by extrusion melt coating of the anthraquinone-derivatized poly(HEMA) acrylic resin onto the PVOH-AQ solution coated PET substrate.

The invention claimed is:

1. Multilayer oxygen absorbing structure comprising at least two reactive oxygen scavenging layers arranged in sequence:
   a rapidly absorbing highly reactive oxygen-scavenging layer, comprising an oxygen permeable matrix polymer and an oxygen scavenger, and
   a long life reactive layer comprising high passive oxygen barrier matrix polymer, and an oxygen scavenger, wherein dimensionless reactivity of each reactive layer, defined in terms of the initial Thiele modulus $\phi_0$ of the equivalent homogeneously reactive uniform layer, is greater than 3, and wherein the rapidly absorbing layer has a passive oxygen permeability of greater than 250 cc mm/(m2 day atm) about 20° C. and relative humidity of 40-60%, and wherein the long life layer has a passive oxygen permeability of less than 2.5 cc mm/(m2 day atm) at about 20° C. and relative humidity of 40-60%.

2. The multilayer oxygen absorbing structure of claim 1 in which the dimensionless reactivity of each reactive layer, defined in terms of the initial Thiele modulus $\phi_0$ of the equivalent homogeneously reactive uniform layer, is greater than 5.

3. The multilayer oxygen absorbing structure of claim 1 in which the oxygen-scavenging system comprises a photo reducible anthraquinone-based oxygen scavenging material.

4. The multilayer oxygen absorbing structure of claim 1 in which the rapidly absorbing layer comprises the oxygen-scavenging reactive material dispersed in a heat sealable oxygen permeable matrix polymer.

5. The multilayer oxygen absorbing structure of claim 4 in which the heat sealable oxygen permeable matrix polymer comprises secondary hydroxyl functionalities.

6. The multilayer oxygen absorbing structure of claim 5 in which the heat sealable oxygen permeable matrix polymer comprises heat sealable acrylic-based adhesive resin.

7. The multilayer oxygen absorbing structure of claim 6 wherein the acrylic-based polymer adhesive is derivatized with an anthraquinone-based oxygen-scavenging functionality covalently attached to the said acrylic polymer.

8. The multilayer oxygen absorbing structure of claim 6 wherein the rapid absorbing layer comprises a polymer blend with at least 50% by weight of an acrylic polymer derivatized with anthraquinone-based oxygen-scavenging functionality.

9. The multilayer oxygen absorbing structure of claim 4 in which the heat sealable oxygen permeable matrix polymer comprises at least 50% by weight ethylene-vinyl acetate copolymer hot melt adhesive.

10. The multilayer oxygen absorbing structure of claim 1 in which the rapidly absorbing layer comprises the oxygen-scavenging reactive material covalently bonded to a heat sealable oxygen permeable matrix polymer.

11. The multilayer oxygen absorbing structure of claim 1 in which the oxygen permeable matrix polymer comprises an oxygen-scavenging reactive species covalently bonded to a non-heat sealable polymer that is blended with a heat sealable polymer to form said oxygen permeable matrix polymer.

12. The multilayer oxygen absorbing structure of claim 1 wherein the oxygen scavenger comprises an anthraquinone-based oxygen absorber activated via photoreduction mechanism.

13. The multilayer oxygen absorbing structure of claim 1 in which the oxygen permeable matrix polymer is characterized by a light transmission level in the near UV range (200-400 nm).

14. The multilayer oxygen absorbing structure of claim 1 in which the long life oxygen barrier matrix polymer comprises polyvinyl alcohol with 50-100% degree of hydrolysis.

15. The multilayer oxygen absorbing structure of claim 1 in which the long life oxygen barrier matrix polymer comprises ethylene vinyl alcohol copolymer with 20-60 mol. % ethylene content.

16. The multilayer oxygen absorbing structure of claim 1 in which the reactive oxygen scavenging species is dispersed in the matrix polymer of the long life layer.

17. The multilayer oxygen absorbing structure of claim 1 in which the long life oxygen scavenging layer comprises anthraquinone-based oxygen scavengers dispersed in a polymer matrix and the oxygen barrier polymer matrix also comprises a source of hydrogen atoms in primary and/or secondary hydroxyl groups for efficient UV light induced keto-enol tautomerization of anthraquinone.

18. The multilayer oxygen absorbing structure of claim 1 further comprising a third layer comprising a passive structural support layer placed adjacent to the long life oxygen scavenging layer on the opposite side from the rapid absorbing layer.

19. The multilayer oxygen absorbing structure of claim 18 in which the support layer is rigid or semirigid thermoplastic polymer.

20. The multilayer oxygen absorbing structure of claim 18 in which the third layer is homogeneous.

21. The multilayer oxygen absorbing structure of claim 18 in which the third layer comprises a water vapor barrier layer or contains a water barrier coating and/or surface treatment.

22. The multilayer oxygen absorbing structure of claim 18 wherein the third passive layer serves as a rigid or semi-rigid structural support layer.

23. The multilayer oxygen absorbing structure of claim 22 wherein the passive structural support layer is made from polyester or polyester copolymer.

24. The multilayer oxygen absorbing structure of claim 23 wherein the polyester is PET or PETG.

25. The multilayer oxygen absorbing structure of claim 23 wherein the polyester is PEN.

26. The multilayer oxygen absorbing structure of claim 23 wherein the polyester is a PET-PEN copolymer.

27. The multilayer oxygen absorbing structure of claim 23 wherein the polyester is made from polyester blend.

28. The multilayer oxygen absorbing structure of claim 27 is polyester/polyamide blend with a continuous polyester phase.

29. The multilayer structure of claim 18 wherein the thickness of the third layer is between 15-500 micrometers and said layer serves as a structural support.

30. The multilayer oxygen absorbing structure of claim 1 wherein the structure possesses oxygen absorbing capability independent of moisture diffusion and relative humidity.

31. The multilayer oxygen absorbing structure of claim 1 wherein the structure is free of transition metals and metal-based catalysts.

32. The multilayer oxygen absorbing structure of claim 31 wherein the long life oxygen scavenger layer serves as a rigid or semi-rigid structural support layer.

33. The multilayer oxygen absorption structure of claim 1 wherein the oxygen scavenger comprises material activated by exposure to actinic radiation in the UV range.

34. The multilayer oxygen absorbing structure of claim 1 wherein the rapid absorbing layer comprises a heat sealable ethylene-vinylacetate copolymer (EVA) or its blend with up to 50% of polyol or polyvinyl alcohol by weight.

35. The multilayer oxygen absorbing structure of claim 34 wherein the EVA copolymer contains 5-35% of vinyl acetate by weight.

36. The multilayer oxygen absorbing structure of claim 1 wherein the oxygen permeability of polymeric matrix material forming the rapid absorbing layer is at least 100 times higher than the oxygen permeability of the polymer matrix material forming the long life oxygen barrier layer.

37. The multilayer oxygen absorbing structure of claim 1 wherein the thickness of the rapid absorbing layer is between 0.1 and 2 mil (2.5-50 micrometers).

38. The multilayer structure of claim 1 wherein the long life layer is between 1 and 5 mil (25-125 micrometers) thick.

39. A method of making a multilayer oxygen absorbing structure comprising sequentially coating a long life highly reactive layer and a rapidly absorbing oxygen highly reactive oxygen scavenging layer on a clear permanent polymeric substrate from water-based coating solutions, wherein dimensionless reactivity of each reactive layer, defined in terms of the initial Thiele modulus $\phi_0$ of the equivalent homogeneously reactive uniform layer, is greater than 3, and wherein the rapidly absorbing layer has a passive oxygen permeability of greater than 250 cc mm/(m2 day atm) at about 20° C. and relative humidity of 40-60%, and wherein the long life layer has a passive oxygen permeability of less than 2.5 cc mm/(m2 day atm) at about 20° C. and relative humidity of 40-60%.

40. The method of claim 39 wherein the polymeric substrate comprises of a removable substrate.

41. The method of claim 39 wherein the long life layer is formed by preparing an aqueous 10-20 wt. % PVOH-anthraquinone salt aqueous solution by sequentially dissolving anthraquinone salt and one or more grades of PVOH of specific molecular weights and degree of hydrolysis in water allowing the simultaneous control of antharquinine salt and PVOH solubility, AQ/PVOH weight ratio in the solution, and the solution viscosity.

42. A package wherein, at least one wall of said package comprises a multilayer oxygen absorbing structure comprising at least two reactive oxygen scavenging layers arranged in sequence:
a rapidly absorbing highly reactive oxygen-scavenging layer, comprising an oxygen permeable matrix polymer and an oxygen scavenger, and
a long life layer comprising high passive oxygen barrier matrix polymer, and an oxygen scavenger, wherein dimensionless reactivity of each reactive layer, defined in terms of the initial Thiele modulus $\phi_0$ of the equivalent homogeneously reactive uniform layer, is greater than 3, and wherein the rapidly absorbing layer has a passive oxygen permeability of greater than 250 cc mm/(m2 day atm) at about 20° C. and relative humidity of 40-60%, and wherein the long life layer has a passive oxygen permeability of less than 2.5 cc mm/(m2 day atm) at about 20° C. and relative humidity of 40-60%.

43. The package of claim 42 in which the dimensionless reactivity of each reactive layer, defined in terms of the initial Thiele modulus $\phi_0$ of the equivalent homogeneously reactive uniform layer, is greater than 5.

44. The package of claim 42 in which the oxygen-scavenging reactive material comprises a photo reducible anthraquinone-based oxygen scavenging material.

45. The package of claim 42 in which the rapidly absorbing layer comprises the oxygen-scavenging reactive material dispersed in a heat sealable oxygen permeable matrix polymer.

46. The package of claim 42 in which the long life layer comprises the oxygen-scavenging reactive material covalently bonded to a heat sealable oxygen permeable matrix polymer.

47. The package of claim 46 in which the heat sealable oxygen permeable matrix polymer comprises secondary hydroxyl functionalities.

48. The package of claim 47 in which the heat sealable oxygen permeable matrix polymer comprises heat sealable acrylic-based adhesive resin.

49. The package of claim 42 in which the oxygen permeable matrix polymer comprises an oxygen-scavenging reactive species covalently bonded to a non-heat sealable polymer that is blended with a heat sealable polymer to form said oxygen permeable matrix polymer.

50. The package of claim 42 in which the oxygen barrier matrix polymer comprises polyvinyl alcohol.

51. The package of claim 42 in which the long life oxygen scavenging layer comprises anthraquinone-based oxygen scavengers dispersed in a polymer matrix comprising of PVOH, EVOH, and mixtures thereof, and the oxygen barrier polymer matrix also comprises a source of hydrogen atoms in secondary hydroxyl groups for efficient UV light induced keto-enol tautomerization of anthraquinone.

52. The package of claim 42 further comprising a passive structural support layer placed adjacently to the long life oxygen scavenging layer on the opposite side from the rapidly absorbing layer.

53. The package of claim 52 in which the support layer is rigid or semirigid thermoplastic polymer.

54. The package of claim 52 wherein the passive structural support layer is made from polyester or polyester copolymer.

55. The package of claim 52 wherein the thickness of the passive structural support layer is between 25 and 500 micrometers and said layer serves as a structural support.

56. The package of claim 42 wherein the long life layer is between 1 and 5 mil thick.

57. The package of claim 52 further comprising at least one side comprising a metal foil.

* * * * *

UNITED STATES PATENT AND TRADEMARK OFFICE
CERTIFICATE OF CORRECTION

| | | |
|---|---|---|
| PATENT NO. | : 8,110,261 B2 | Page 1 of 1 |
| APPLICATION NO. | : 12/055632 | |
| DATED | : February 7, 2012 | |
| INVENTOR(S) | : Stanislav E. Solovyov and Thomas H. Powers | |

It is certified that error appears in the above-identified patent and that said Letters Patent is hereby corrected as shown below:

On the title page item (75), before "Solovyov" delete "Stanislov" and insert --Stanislav E.--.

Signed and Sealed this
Twenty-first Day of August, 2012

David J. Kappos
*Director of the United States Patent and Trademark Office*